United States Patent
Sloop

[15] 3,704,001
[45] Nov. 28, 1972

[54] MOUNTING BRACKET

[72] Inventor: Clifford E. Sloop, 2230 10th Street, Columbus, Ga. 31902

[22] Filed: Nov. 17, 1970

[21] Appl. No.: 90,272

[52] U.S. Cl. ................................248/221, 248/230
[51] Int. Cl. .................................................H02g 7/20
[58] Field of Search ........248/221, 230, 231; 52/721; 174/163; 211/107

[56] References Cited

UNITED STATES PATENTS

| | | | |
|---|---|---|---|
| 2,990,151 | 6/1961 | Phillips | 248/230 X |
| 1,592,530 | 7/1926 | Lee | 248/231 |
| 2,883,135 | 4/1959 | Smalley | 248/230 |
| 2,883,136 | 4/1959 | Smalley | 248/230 |
| 2,672,693 | 3/1954 | Cannell | 248/231 X |
| 2,879,964 | 3/1959 | Anderson et al. | 248/221 |

Primary Examiner—J. Franklin Foss
Attorney—Newton, Hopkins & Ormsby

[57] ABSTRACT

A mounting bracket for supporting electrical power transformers in clusters of three is disclosed. A first embodiment of the invention comprises a one piece, substantially V-shaped bracket adapted to be mounted to a utility pole and configured to support transformers at the ends of each of its legs and at its vertex. The bracket may be mounted either by direct bolting to a pole, or by use of an island plate abutting a pole and fastened to the legs of the bracket. A second embodiment of the invention may be secured to a pole in the same manner, is also substantially V-shaped, but is assembled of several parts. This embodiment permits angular adjustment of the transformer mounting positions.

6 Claims, 9 Drawing Figures

PATENTED NOV 28 1972　　　3,704,001
SHEET 1 OF 2
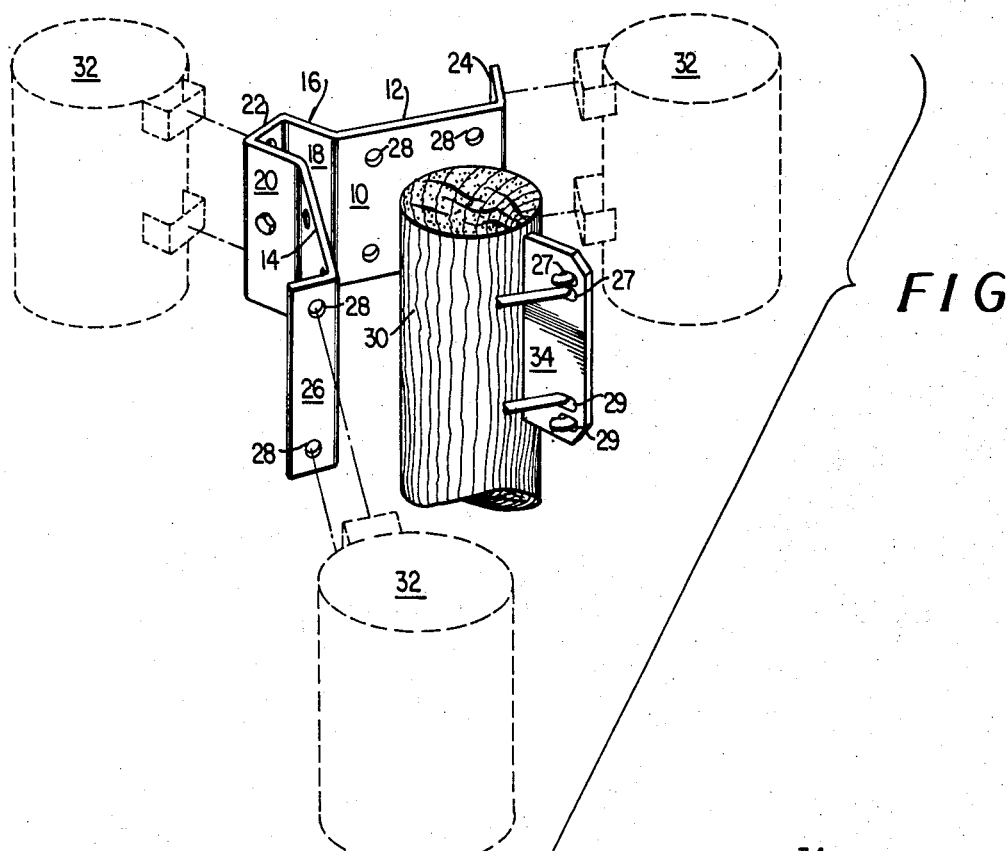
FIG 1
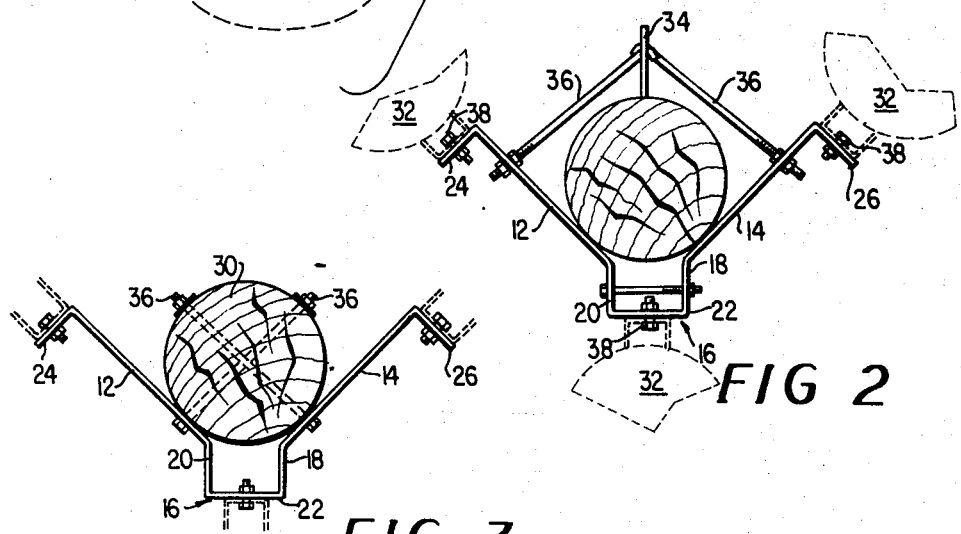
FIG 2
FIG 3
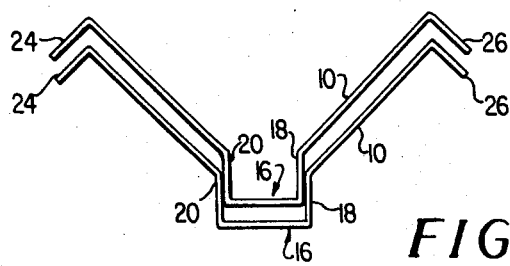
FIG 4
INVENTOR
CLIFFORD E. SLOOP
BY: Newton, Hopkins, & Ormsby
ATTORNEYS

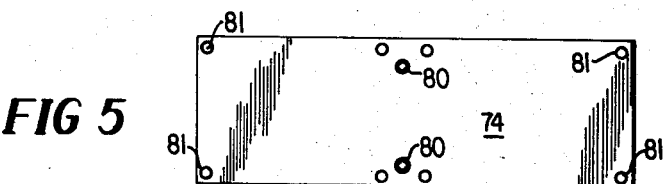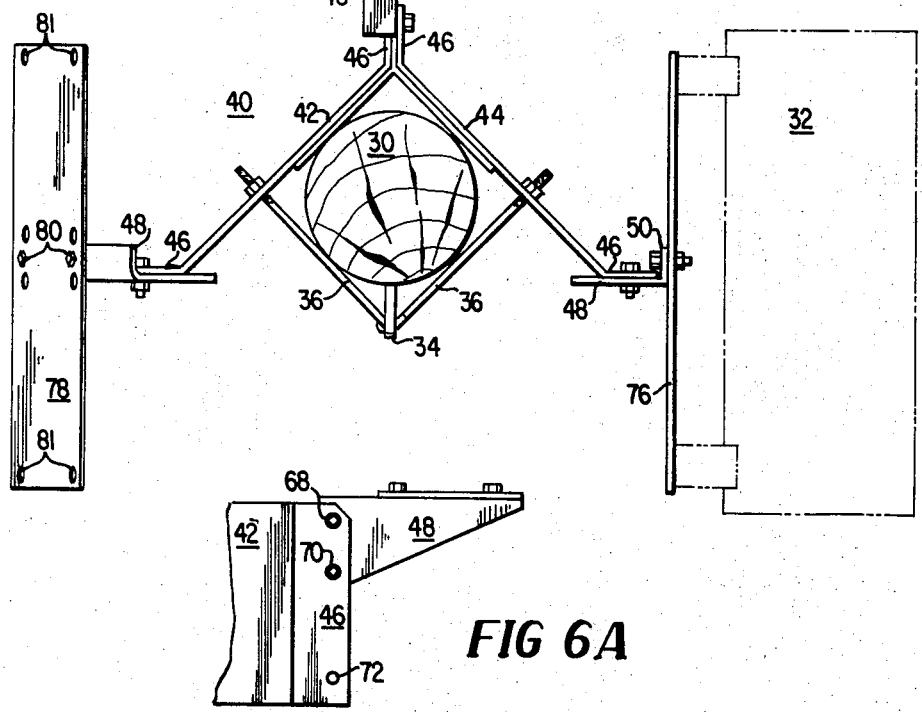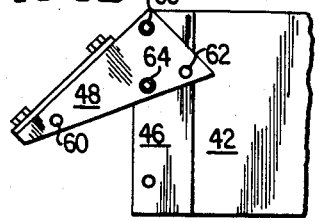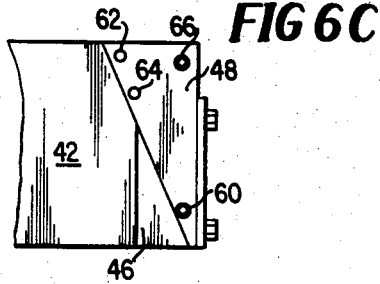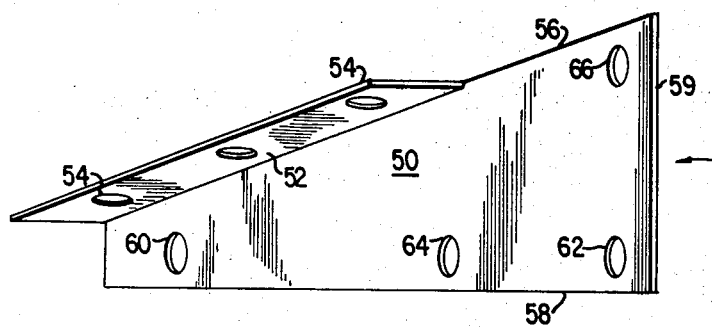

MOUNTING BRACKET

BACKGROUND OF THE INVENTION

This invention relates generally to the art of mounting or supporting brackets, and more particularly to brackets for supporting heavy electrical equipment such as transformers.

Ever since electric power came into widespread use, the problem of supporting electrical transformers on utility poles has existed. The advent of three phase power compounded the problem, since three phase power requires separate transformers for each phase. Because of the now common use of three phase power, it is therefore generally necessary to mount electrical power transformers in clusters of three.

In early times, when the use of electrical power was limited, transformers were small and therefore the three transformers were simply mounted in a row on rigid wooden cross arms attached to utility poles. As the extent of use of electrical power grew, the transformers also grew in size and weight, so that it eventually became necessary to support them on heavy wooden beams supported at each end by a separate utility pole. This type of mount was quite bulky, since it required enough space to plant two separate utility poles far enough apart to accommodate a cross beam sufficiently long to carry three transformers. It was also a time consuming and an extremely expensive manner of mounting transformers, since a considerable amount of time was required to mount the two utility poles and because the cost of utility poles and their installation was high. In an effort to circumvent these problems of bulkiness and undue cost, a circular band transformer mounting bracket was developed, which, with numerous minor modifications, is perhaps the most commonly used transformer mounting bracket today. However, even this mounting bracket possessed a variety of disadvantages. For example, in order to make the heavy band structures adjustable, so that they could be used with utility poles of varying diameters, complicated and expensive adjusting hardware had to be built into each such bracket manufactured. In addition to making the brackets expensive and difficult to install, this adjusting hardware also caused them to be unsymmetrical. These brackets were constructed such that two transformers were mounted, one on either side of a utility pole, while the third transformer was mounted at an angle of 90° to the line defined by the other two resulting in a highly unsymmetrical configuration. The unsymmetrical configuration was necessary because the adjusting hardware mentioned above occupied a large portion of the diameter of the bracket, making the mounting of transformers in a symmetrical fashion impossible.

Some modified mounting brackets of the steel band variety have been developed which permit transformers to be mounted symmetrically around utility poles. However, even these structures require a larger number of parts, are complicated and expensive to manufacture, and are very difficult to adjust and install.

SUMMARY OF THE INVENTION

Accordingly, one object of this invention is to provide a simple and effective yet inexpensive transformer mount.

Another object of this invention is to provide a novel transformer mounting bracket that is relatively easy to install.

Yet another object of this invention is to provide a transformer mounting bracket including novel means for mounting to a utility pole.

A still further object of this invention is the provision of an improved mounting bracket for electrical equipment that may be mounted in a plurality of manner to utility poles.

A still further object of this invention is the provision of a novel transformer mounting bracket that permits the mounting of transformers in a plurality of positions.

Yet another object of this invention is to provide a transformer mounting bracket that fits utility poles in a broad range of sizes without need for adjustment.

Briefly, these and other objects of the invention are achieved by constructing a generally V-shaped bracket adapted to receive a utility pole within the legs of the V. The bracket may be secured to the utility pole either by means of bolting directly through the pole or by use of an island plate positioned against the pole and fastened to the bracket. Transformers may be mounted in fixed positions, or alternatively may be mounted on angularly adjustable plates.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying Drawings, wherein:

FIG. 1 is a perspective exploded view of one embodiment of the invention;

FIG. 2 is a cross-sectional view of one embodiment of the invention showing the technique of mounting a bracket to a utility pole using an island plate;

FIG. 3 is a cross-sectional view of one embodiment of the invention showing a technique of mounting a bracket to a utility pole using bolts;

FIG. 4 is a cross-sectional view of one embodiment of the invention illustrating the stacking of brackets;

FIG. 5 is a cross-sectional view of a second embodiment of the invention showing angularly adjustable transformer mounts;

FIGS. 6a, 6b, and 6c are plan views of the second embodiment of the invention showing the details of the angularly adjustable transformer mounts; and, FIG. 7 is a perspective view of an adjustable support bracket.

DESCRIPTION OF AN ILLUSTRATIVE EMBODIMENT

Referring now to the Drawings, wherein like reference numerals designate identical or corresponding parts throughout the several views, and more particularly to FIG. 1 thereof, the instant invention is shown as including a primarily V-shaped bracket 10, which may, for example, be formed of a single sheet of steel, aluminum alloy, or other suitable material.

Bracket 10 is formed of a pair of leg portions 12 and 14 oriented at an angle of approximately 90° to one another and joined by a three-sided channel portion 16. Channel portion 16 is of U-shaped or rectangular cross-section and includes two side portions 18 and 20, respectively, interconnected by a base portion 22. Legs 12 and 14 join side portions 18 and 20, respectively, with the plane of each leg forming an angle of approximately 135° with the plane of its associated side portion. At the ends of legs 12 and 14 opposite channel portion 16 are two wing or flange portions 24 and 26, respectively. Flange portions 24 and 26 are formed of portions of the same sheets of material as legs 12 and 14 bent at angles of 90° relative to the leg portions. A plurality of mounting holes 28 are drilled throughout the structure of bracket 10. For example, four holes 28 may be drilled in each of leg portions 12 and 14 for mounting bracket 10 to a utility pole. Two holes 28 may be drilled in each of flange portions 24 and 26, as well as in channel base portion 22 for securing the transformers or other equipment to be supported to bracket 10.

In use, bracket 10 is placed adjacent a utility pole 30 with the utility pole between and tangent to leg portions 12 and 14. The bracket 10 is secured to the pole in one of two alternative methods to be discussed more fully hereinafter, and then three transformers 32 are secured to flange portions 24 and 26 and to channel base portion 22.

It will be noted that the purpose of channel portion 16 is to permit a transformer to be mounted to channel base 22 after bracket 10 has been secured to utility pole 30. That is, leg portions 18 and 20 of channel portion 16 cause channel base portion 22, to which the transformer 32 will be mounted, to be spaced from utility pole 30 such that there will be sufficient room for mounting bolts or other fastening means between utility pole 30 and the inside face of channel base portion 22. This same room, of course, is also used for the insertion of tools, such as wrenches, to simplify the task of tightening bolts when mounting a transformer to channel base 22.

Although in FIG. 1 the side portions 18 and 20 of channel section 16, as well as flange portions 24 and 26 are shown to be relatively short in length compared with leg portions 12 and 14, these various channel side and wing portions may be lengthened should circumstances warrant such modification.

As noted hereinabove, the mounting of bracket 10 may be accomplished in either of two manners. The first technique of mounting bracket 10 involves the use of an island plate 34 and is shown most clearly in FIG. 2. The island plate 34, which is also shown in FIG. 1, is a flat, generally rectangular piece of metal, in which at least four holes 29 are drilled. Island plate 34 includes pairs of closely spaced holes 29, both pairs of holes being located along one edge of island plate 34 and near the corners of the plate. Holes 29 are made oval, rather than simply round, in order to accommodate bolts passing through them at an angle.

The technique of using island plate 34 is shown in FIGS. 1 and 2. Initially, bracket 10 is placed against utility pole 30 with the utility pole inside the V formed by leg portions 12 and 14. Island plate 34 is then placed adjacent pole 30 at a position halfway between leg portions 12 and 14 and opposite channel member 16 of bracket 10. A plurality of bracket mounting bolts 36, four, for example, are then passed through holes 29 in island plate 34 and through holes 28 in leg portions 12 and 14. Placing nuts on these bolts and tightening the nuts draws island plate 34 into tight non-sliding engagement with utility pole 30, thereby preventing bracket 10 from sliding or moving in any way on pole 30. Transformers 32 may then be bolted to wing portions 24 and 26 and to channel base portion 22 by means of a plurality of transformer mounting bolts 38.

A second means of mounting bracket 10 without using island plate 34 is illustrated in FIG. 3. In lieu of the use of island plate 34, holes may be drilled directly through utility pole 30, and bracket mounting bolts 36 may be placed through holes 28 in leg portions 12 and 14 of bracket 10 and then through the holes drilled through utility pole 30. Once nuts are fastened to the ends of these bolts, bracket 10 is secured directly to pole 30 and transformers 32 may then be fastened to bracket 10.

Both of these mounting techniques possess certain advantages. The island plate technique requires an additional part, but does not require drilling through the utility pole. Thus, it is advantageous where it is desired not to weaken the pole by drilling through it, or where the pole is of a material that cannot easily be drilled. Direct bolting to a pole is more conventional, and may be useful where pole drilling equipment is readily available, and no special problems exist.

As will be apparent to those skilled in the art, the configuration of bracket 10, as well as the mounting techniques described hereinabove, provide numerous advantages. For example, the V-shaped configuration of bracket 10 enables it to fit poles with a broad range of diameters without any need for adjustment or bending of any sort. The bracket member may simply be placed up against virtually any pole and the V-shaped configuration of its leg portions 12 and 14 permit immediate adjustment to the diameter of the pole. In addition, the relatively straightforward shape of bracket 10 permits extremely easy manufacture since the bracket may be made of a single sheet of material, such as steel, aluminum alloy, and the like, which is bent to an appropriate degree at appropriate points. This may be done in a simple series of breaking operations without any need for any heat treating of the bracket material.

Furthermore, as shown in FIG. 4, V-shaped brackets 10 may be compactly stored since they may be stacked one upon another without wasting space. This may be achieved either by producing a plurality of brackets 10 with channel portions 16 of various sizes so that the channel portions may fit inside one another, or brackets 10 may be formed with the side walls 18 and 20 of channel member 16 angled slightly apart from one another, in which case brackets 10 will also be able to be stacked closely one upon another.

A second embodiment of the invention is shown in FIG. 5. Like the embodiment of FIGS. 1 through 4, the FIG. 5 embodiment shows a bracket assembly 40 which is generally V-shaped. Unlike the previously described embodiment, bracket assembly 40 is not comprised of a single piece of metal, but instead includes a plurality of pieces assembled together. More particularly, bracket assembly 40 includes two identical leg portions 42 and 44. At each end of both of leg portions 42 and 44 is a foot portion 46 formed by bending a portion of each of ends of legs 42 and 44 so that the planes of bent portions (i.e., foot portions 46) form an angle of approximately 135° with the planes of the leg portions 42 and 44. Two foot portions 46 are then bolted directly to one another in such a manner that leg arm portions 42 and 44 are secured together and are positioned at an angle of approximately 90° to one another. This assembly results in a V-shaped bracket in which the two foot portions 46 which are bolted together are positioned at the vertex of the V, while portions 42 and 44 form the legs of the V, with an angle of approximately 90° between them. This V-shaped assembly may be mounted to a utility pole 30 in precisely the same manner as was the embodiment of FIGS. 1 through 4; that is, using either an island plate 34 or directly bolting the arms 42 and 44 of the bracket to pole 30. However, the means of mounting transformers to bracket assembly 40 is different than for bracket 10.

An adjustable support bracket 48 must be secured to the three extremities of bracket 40 before transformers can be mounted on the bracket assembly.

As shown most clearly in FIG. 7, adjustable support brackets 48 each consist of a single panel of metal bent into two planar portions 50 and 52 at right angles to one another. Planar portion 52 is simply a rectangular area having a pair of mounting holes 54 drilled in it, although it is somewhat shorter than planar portion 50. Planar portion 50 which is in the general configuration of an elongated right triangle with one of its points truncated, has a base 56, with which planar portion 52 in integral, and a hypotenuse 58. These two sides are joined by a third side 59. A plurality of holes 60, 62, 64, and 66 are drilled at various points through planar portion 50. More particularly, hole 60 is drilled near the point at which base 56 and hypotenuse 58 intersect. Hole 62 is drilled near the point at which third side 59 and hypotenuse 58 intersect. Hole 64 is drilled near hypotenuse 58 on a line established by holes 60 and 62. Hole 66 is drilled near the point at which base 56 and third side 59 intersect. It is significant that the distance between holes 66 and 64 is the same as that between holes 66 and 62 to facilitate adjustment of support brackets 48.

As was previously pointed out, adjustable support brackets 48 are mounted to foot portions 46. Referring now to FIGS. 6a, 6b, and 6c, the various manners in which adjustable support brackets 48 may be secured to foot portions 46 are shown more clearly. Referring first to FIG. 6a, it is shown that each of foot portions 46 includes three holes 68, 70 (shown with bolts through them), and 72 arranged in a line. The spacing between the holes is such that the distance between holes 68 and 70 in foot portions 46 is equal to the distance between holes 66 and 62 as well as that between holes 66 and 64 of adjustable support brackets 48. The distance between holes 68 and 72 of foot portions 46 is the same as that between holes 60 and 66 of support brackets 48. As a result, it is possible to mount adjustable support brackets 48 to foot portions 46 in three possible angular configurations as shown in FIGS. 6a, 6b, and 6c. For example, in FIG. 6a, adjustable support bracket 48 is shown aligned in such a manner that holes 66 and 62 of support bracket 48 are juxtaposed to holes 68 and 70 of foot portion 46. Similarly, in FIG. 6b, holes 66 and 64 of support bracket 48 are juxtaposed to holes 68 and 70 of foot portion 46, causing support bracket 48 to be fastened at an angle different from that shown in FIG. 6a. Again, in similar fashion, FIG. 6c shows adjustable support bracket 48 arranged so that holes 66 and 60 are juxtaposed to holes 68 and 72 of foot portion 46, causing adjustable support bracket 48 to be fixed in yet a third position relative to foot portion 46.

The significance of these various positions in terms of transformer mounting is illustrated most clearly by reference to FIG. 5. There, a plurality of identical transformer mounting plates 74, 76, and 78 are shown secured to adjustable support brackets 48. Transformer mounting plates 74, 76 and 78 are basically rectangular plates of suitable metal material through which plate mounting holes 80 (shown with bolts through them) and transformer mounting holes 81 have been drilled. The transformer mounting plates 74, 76 and 78 are secured to adjustable support brackets 48 by placing the mounting plates parallel with planar portion 52 of adjustable support brackets 48, and juxtaposing holes 80 in transformer mounting plates 74, 76, and 78 with holes 54 in the planar portion 52. Bolts may then be passed through the juxtaposed holes and the transformer mounting plates may thereby be secured in position on adjustable mounting brackets 48. The angle at which the transformer mounting plates 74, 76 and 78 are secured relative to utility pole 30 depends upon the angle at which adjustable mounting brackets 48 are mounted to leg portions 46. For example, referring to FIGS. 5 and 6a, b, and c, the position of transformer mounting plate 74 in FIG. 5 corresponds to the mounting position of adjustable support bracket 48 in FIG. 6a. Similarly, the position of transformer mounting plate 76 in FIG. 5 corresponds to the mounting position of adjustable support bracket 48 in FIG. 6c, and the position of transformer mounting plate 78 in FIG. 5 corresponds to the angular position of adjustable support bracket 48 as shown in FIG. 6b. More particularly, if holes 66 and 62 of adjustable support brackets 48 are juxtaposed to holes 68 and 70 of foot portions 46, the transformer mounting plates 74, 76 and 78 will be in a vertical position. That is, the plane of the transformer mounting plates will be perpendicular to the axis of the utility pole 30. Likewise, if holes 60 and 66 of adjustable support brackets 48 are juxtaposed to holes 68 and 70 of foot portions 46, transformer mounting plates 74, 76, and 78 will be in the horizontal position; that is, the plane of the transformer mounting plates will be parallel to the axis of utility pole 30. Similarly, if holes 66 and 64 of adjustable support brackets 48 are juxtaposed to holes 68 and 70 of foot portions 46, the plane of transformer mounting plates 74, 76 and 78 will be at an angle of 45° to the axis of utility pole 30.

It will be noted that each of adjustable support brackets 48 may be moved from any one of the three positions described to any other position simply by changing the position of one bolt. That is, the bolt through hole 66 of each adjustable support brackets 48 and through hole 68 of foot portion 46 may be left in place to act as a pivot as the angular position of the adjustable support brackets is changed.

These adjustable positions are advantageous to utility companies in that they provide a great deal of flexibility in the mounting of transformers and therefore simplify the coupling of power lines to the transformers and from the transformers to consumer facilities. In addition, the structure of the bracket assembly 40 is extremely simple and therefore makes the brackets extremely inexpensive to manufacture and also permits them to be manufactured with the very simplest machinery.

Obviously, numerous modifications and variations of the present invention are possible in light of the above teachings. It is therefore to be understood that within the scope of the appended claims, the invention may be practiced otherwise than as specifically described herein.

What is claimed is:

1. A mounting bracket comprising:
   a. first and second leg means oriented at an angle to one another adapted to abut a supporting pole means, each of said leg means including angularly formed end portions adjacent each end thereof;
   b. means joining said first and second leg means together at one end thereof, with one end portion of a first leg means connected in abutting relationship with one end portion of said second leg means by passing a number of connecting bolts through aperture means formed therein, whereby said first and second leg means will be angularly disposed to form a vertex therebetween;
   c. first load mounting means formed on one end of said first leg means opposite said vertex;
   d. second load mounting means formed on an end of said second leg means opposite said vertex;
   e. third load mounting means formed on said first and second leg means at said vertex; and,
   f. means for mounting said bracket on said supporting pole with said leg members in abutting relation with the surface of said supporting pole, said mounting means including a plate element supported in radially extending and abutting relationship with the surface portion of said supporting pole and wherein adjustable means is provided for securing each of said mounting bracket legs to said plate whereby said mounting bracket will be clamped to the surface of the supporting pole.

2. A mounting bracket as described in claim 1 further characterized in that each of said load mounting means includes a supporting plate member and wherein said supporting plate member is adjustably connected to each of said load mounting means whereby said supporting plate member can be selectively positioned at a number of supporting positions angularly disposed relative to the longitudinal axis of said supporting pole means.

3. A mounting bracket comprising:
   a. first and second leg means oriented at an angle to one another and adapted to abut a supporting pole means;
   b. means joining said first and second leg means together at one end thereof to form a vertex between said first and second angularly oriented leg means, said joining means including leg portions integrally formed with said leg means and each of which form respective parallel side portions joined by an integrally formed base portion;
   c. first load mounting means formed on an end of said first leg means opposite said vertex;
   d. second load mounting means formed on an end of said second leg means opposite said vertex;
   e. third load mounting means formed on said base portion at said vertex; and
   f. means for mounting said bracket on said supporting pole with said leg members in abutting relationship with the surface of said supporting pole, said mounting means including a plate element supported in radially extending and abutting relationship with the surface portion of said supporting pole and including elongated adjustable tension bolt means securing each of said mounting bracket legs to said plate, wherein said mounting bracket will be clamped to the surface of said supported pole in response to adjustment of said tension bolt means.

4. A mounting bracket as described in claim 3 further characterized in that each of said load mounting means includes adjustable means and wherein each of said adjustable means is selectively settable to a number of angularly adjusted positions.

5. A mounting bracket as described in claim 3 further characterized in that each of said load mounting means includes a supporting plate member and wherein a supporting plate member is adjustably connected to each of said load mounting means whereby said supporting plate member can be selectively positioned at a number of supporting positions angularly disposed relative to the longitudinal axis of said supporting pole means.

6. A mounting bracket comprising:
   a. first and second leg means oriented at substantially a ninety degree angle relative to one another to define a pole receiving area therebetween, with said leg means adapted to be supported in abutting engagement with a supporting pole means such that said leg means contacts said supporting pole means at circumferentially spaced locations, and wherein each of said leg means defines an opening formed therein adjacent the point of contact of said leg means with said supporting pole means;
   b. means joining said first and second leg means together at one end thereof to form a vertex between said first and second angularly oriented leg means, said joining means including leg portions integrally formed with said leg means and each of which form respective parallel side portions joined by integrally formed base portion;
   c. first load mounting means formed on an end of said first leg means opposite said vertex;
   d. second load mounting means formed on an end of said second leg means opposite said vertex;
   e. third load mounting means formed on said base portion at said vertex; and
   f. means for mounting said bracket on said supporting pole with said leg members in abutting relationship with the surface of said supporting pole and with said legs contacting said pole at said circumferentially spaced location adjacent said openings formed in said legs, and wherein said mounting means includes at least one elongated adjustable tension bolt means extending through said opening in each of said leg means and through complementary openings formed in said supporting pole, and wherein said elongated tension bolt means are oriented at substantially a ninety degree angle relative to each other when secured in a bracket supporting relationship.

* * * * *